6111X
W. Clark.
Spinning Mach.
Patented Oct. 1, 1830.
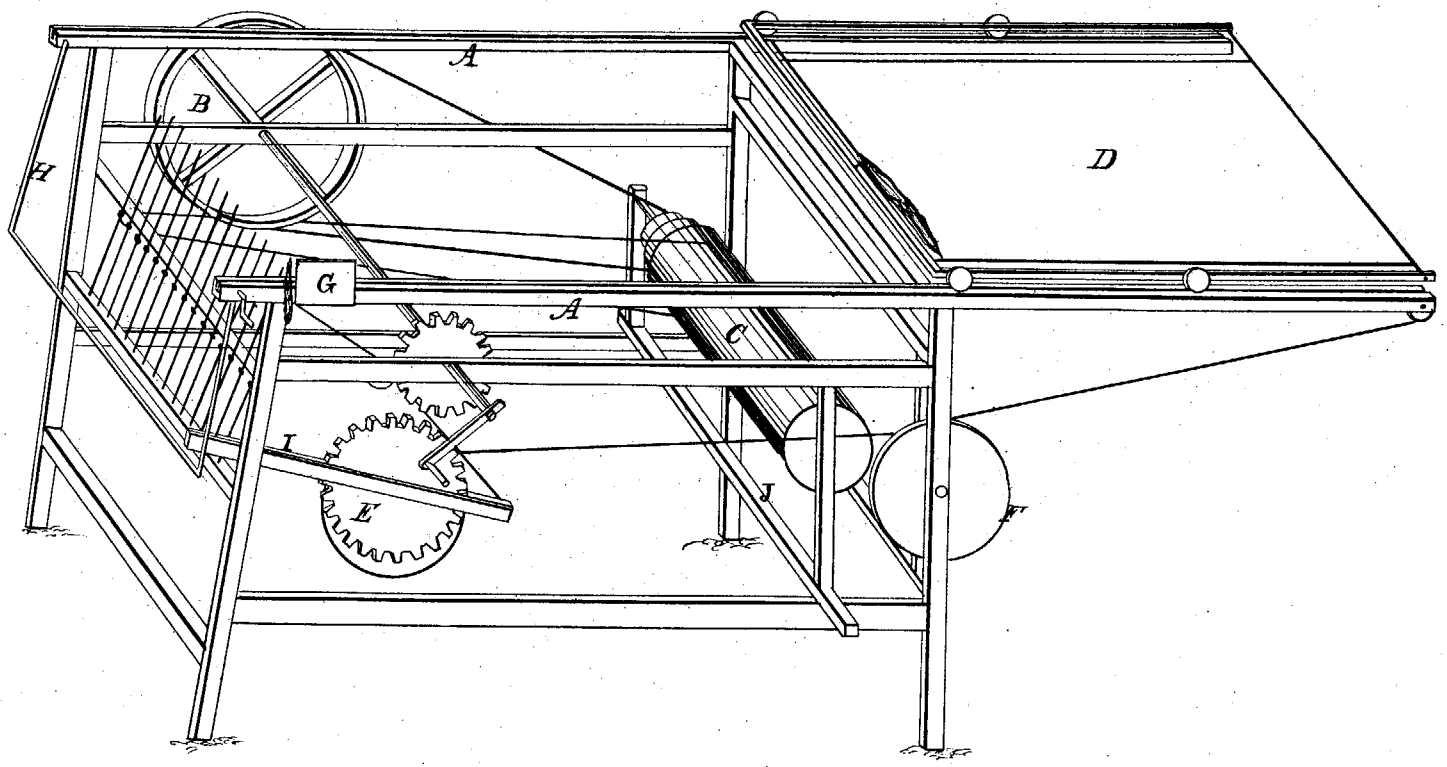
N. PETERS, PHOTO-LITHOGRAPHER, WASHINGTON, D. C.

Oct 1. 1830

William Clark 6111X

Letters Patent

The Schedule referred to in these Letters Patent & making part of the same
containing a description in the words of the said William Clark himself
of his improvement in the Spinning machine The farmers Spinning is a Machine intended for the use of families, & small
manufacturing Establishments in spinning of Wool. It consists of a frame
2½ feet in hight, about 4 feet in length and a sufficient width
for the number of spindles required. allowing about 2¼ inches to a spindle.
The frame is composed of timber about 2 inches square with 4 posts. 4
side girts. 4 cross girts with 2 arms or plates 7 feet in length project
ing in rear about 3 feet from the frame or back posts. The front posts
incline a little back of the top end which gives the spindles that are ap
pended to the upper front girt which is about 12 inches below the top
of the frame. an inclination towards the roll carriage. the top side girts
are 7 inches below the top of the frame; the lower side girts are 2 feet below
the top of the frame: the rear top girt about 5 inches from the top. the
lower rear girt 17 inches from the top of the frame, the lower front girt
2 feet 2 inches from the top of the frame. There is a breast board that
rests upon the upper side girts that the spindles rest against between
the whirls and buzzes. There is a shaft placed transversely and rests
upon the upper side girts, about 8 or 9 inches from the front end
on one end of this shaft outside of the frame is a wheel about 22
inches in diameter with a groove for a band. on the other end is a
crank for turning it There is a band passing from this wheel to the
whirls on the cylinder which is from 5 to 6 inches in diameter. The
cylinder is about 8 or 9 inches in diameter. the cylinder rests on
two short posts about 8 inches in hight framed in a cross bar that
rests on the lower side girts about 7 inches forward of the rear posts
the band passes around the cylinder to the whirls on the spindles

[illegible]

6118 which is about 3/4 of an inch in diameter. the carriage is mounted
on 4 small wheels about 2 inches diameter which moves in a groove
on the top of the arms or plates in front end of the carriage are
two pieces matched together called the clove the side pieces are
in four parts two on a side confined together at the back and
the under side piece serves - - - as a spring to close the clove up
on the rolls. the lower part of the clove upon the lower side piece
& the upper part of the clove upon the upper side piece so as to
open for the rolls to pass thro. the clove is opened by means of
a lever which is brought down into a notch in the corner of a
carriage. about one inch back of the clove is a roller with a
cog wheel on one end of the same size of the roller. at the back
end of the carriage is another roller with a canvass around them
both in form of a band on which the rolls are placed directly
over the front Roller is another roller to confine the rolls when the clove
is open directly over the ~~front~~ end of the - - front roller is
a row of cogs projecting from a board 9 or 10 inches in length at-
tached to the outside of the arm called the comb. into which the
cog wheel works when the clove is open & serves to feed in the rolls
The carriage is drawn back by means of a cog wheel upon the main
shaft about 4 inches in diameter. this works into another cog wheel
which is placed directly beneath in a mortise in a board 8 inches in
diameter. one end of this board rests upon the upper front cross
girt. the other end rests on a cord passing over a pully to a
latch standing perpendicularly near the front end of the frame
& so fixed when the roll carriage is drawn forward by wind
ing up of the threads it moves the top of the latch forward & brings
the two cog wheels into gear. the latch is kept in this position by
a trigger two feet in length fixed on the under side of the arm
or plate which serves as a catch, by the assistance of a spring there
is a cord passing from this from the trigger to the carriage of suit
able length that when the threads are drawn out, the trigger is
drawn back which lets the cog wheels out of gear on one side of the large cog wheel is a grooved wheel of the same size. its axis is one inch from the centre and is made fast to the cog wheel. there is another wheel with two grooves one of 8 inches, the other of four inches in diameter. attached to the rear post there is a cord made fast in the smallest groove & wound 3 or 4 times around from thence to the grooved wheel appended to the cog wheel & made fast to the groove on the side nearest its axis there is a cord made fast in the groove of the large wheel which is attached to the rear post & passing round a pulley at the back end of the arm or plate and made fast to one side of the carriage near the centre which gives the carriage its proper motion when the wheels turn; there is a small cord & weight appended to the axis of the large cog wheel which turns it back to its proper position when out of gear. the large cog wheels may be made of wood or castings. the threads are guided to the spindles by means of a wire fixed in the ends of the arms with a crank for turning it. The method of useing the farmers spinner. the person stands or sits by the side of the Machine with the right hand holds of the crank. the rolls are placed on the top of the carriage with the ends passing thro the Clove and pinned to the spindles. the clove is opened by the hand pressing down the lever into the notch in the corner of the carriage & is closed upon the rolls as soon as a sufficient length is passed thro for the next threads. by means of the lever coming in contact with a pin placed in the top of the comb which disingages it from the notch. Then turn until the threads are drawn & twisted then with the left hand holds of the handle of the guide: wire the threads are run on the spindles Witnesses
Aaron Rogers
Lewis Hoyt Wm. Clark

[illegible]

1120 [illegible]